May 10, 1966  R. W. WINBERG  3,250,657
MACHINE AND METHOD FOR MANUFACTURING BELTS
Filed Sept. 19, 1963  5 Sheets-Sheet 1

INVENTOR.
RAGNAR W. WINBERG
BY *Amster & Levy*
ATTORNEYS

May 10, 1966 R. W. WINBERG 3,250,657
MACHINE AND METHOD FOR MANUFACTURING BELTS
Filed Sept. 19, 1963 5 Sheets-Sheet 2

INVENTOR.
RAGNAR W. WINBERG
BY Amster & Levy
ATTORNEYS

May 10, 1966  R. W. WINBERG  3,250,657
MACHINE AND METHOD FOR MANUFACTURING BELTS
Filed Sept. 19, 1963  5 Sheets-Sheet 3
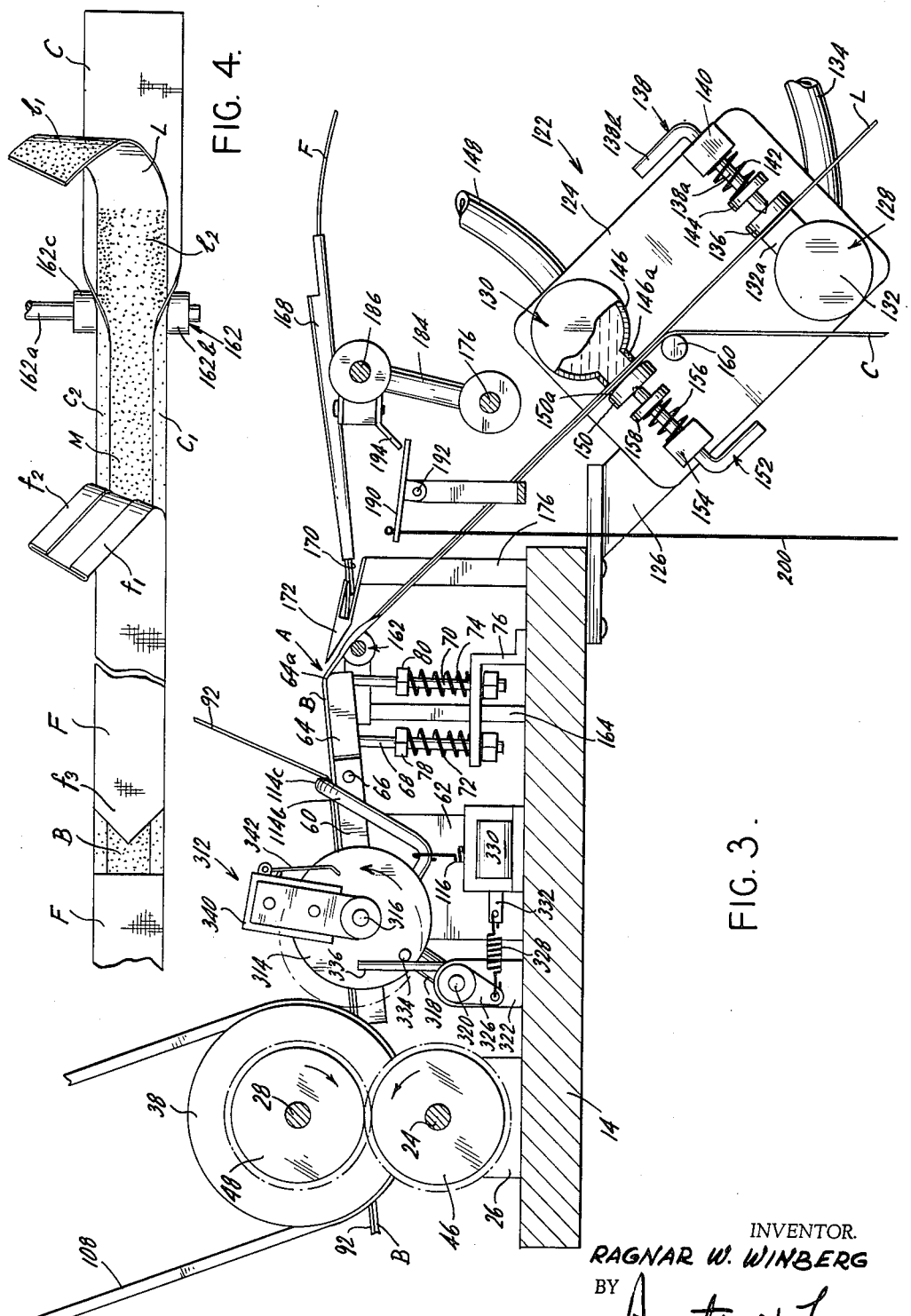
INVENTOR.
RAGNAR W. WINBERG
BY Amster & Levy
ATTORNEYS

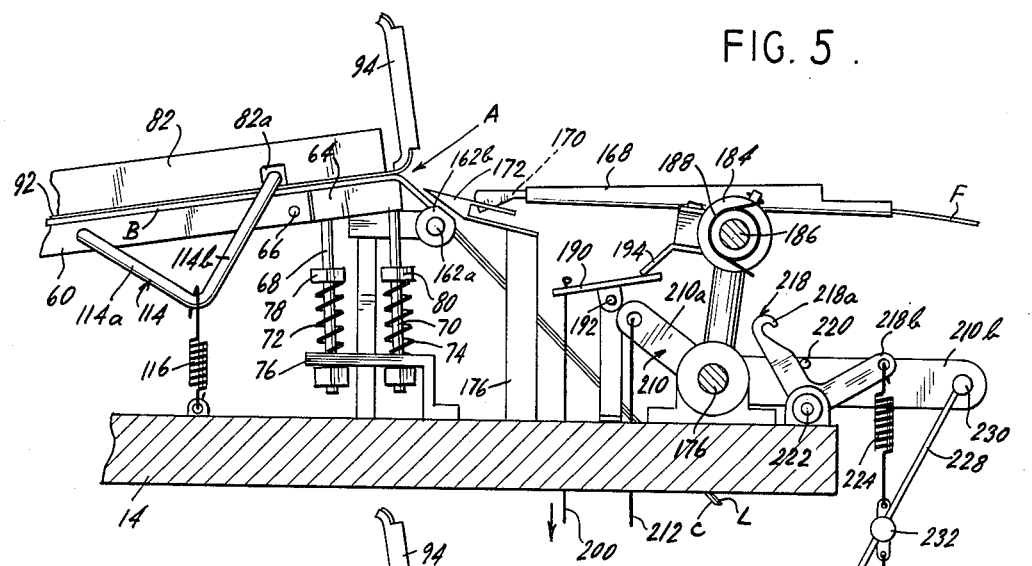
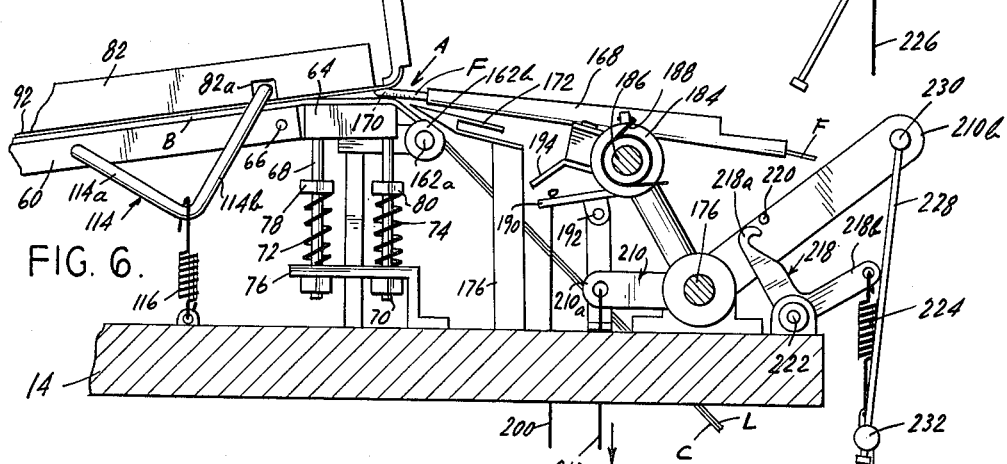
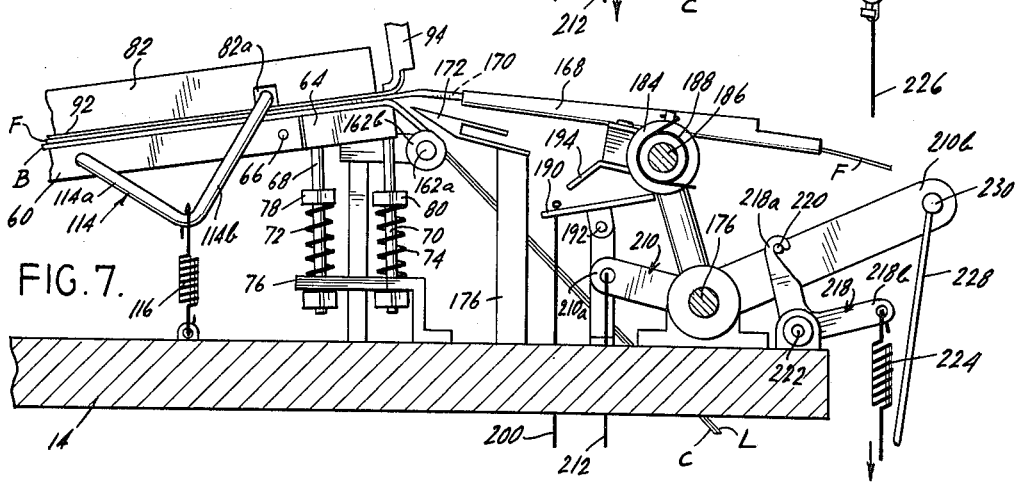

May 10, 1966   R. W. WINBERG   3,250,657
MACHINE AND METHOD FOR MANUFACTURING BELTS
Filed Sept. 19, 1963   5 Sheets-Sheet 5

INVENTOR.
RAGNAR W. WINBERG
BY Amster & Levy
ATTORNEYS

United States Patent Office 3,250,657
Patented May 10, 1966

3,250,657
MACHINE AND METHOD FOR MANUFACTURING BELTS
Ragnar W. Winberg, 115 W. Elder Ave., Floral Park, N.Y.
Filed Sept. 19, 1963, Ser. No. 309,975
11 Claims. (Cl. 156—202)

The present invention relates to belt assembly apparatus and methods, and in particular to an improved machine and method for forming backing from a covering and filler and for assembling the thus formed backing to a facing to form a belt.

In my U.S. Patent No. 2,635,670, issued on April 21, 1953, there is disclosed a method and apparatus for manufacturing belts in which successive lengths of facing are adhesively secured to a continuous length of belt backing, with each length of facing having its opposite sides folded under and its leading end turned to form a V-shaped point. With such machine, it is necessary to purchase manufactured belt backing which is usually made up of filler (i.e. of one or more layers of paper) and a covering which is bonded thereto. Such belt backing may be purchased from a number of sources in varying stock colors and is available in finished rolls ready for use in the aforesaid machine. In the actual use of the machine, the operator puts in the appropriate supply of the prefinished belt backing and feeds successive lengths of the facing into the machine for folding and adhesive securement to the backing.

Although the aforesaid apparatus and method represent a notable advance in the manufacture of belts, it is still necessary for the clothing or belt manufacturer to stock a large supply of prefinished belt backings of different colors in order to be able to match such backings to various facings. In this connection, the facing is taken from the lay of goods when cutting any particular garment; and an attempt is made to closely match the backing thereto from stock colors which are available from backing manufacturers. When a belt or garment manufacturer desires to manufacture a so-called reversible belt or to employ a belt backing of anything but the standard available colors, it is usually necessary for the garment manufacturer to supply the backing manufacturer with covering material to be made up as a special order into belt backing.

The unit cost of belts made as described is relatively high in that the backing manufacturer makes the backing in separate operation; and the garment or belt manufacturer makes the completed belt in a further operation, using the prefinished backing which is purchased or specially prepared. Substantial savings could be realized if it were possible to both make the backing and join the same with the facing to form the belt in a single machine operation. Further, the ability of the garment or belt manufacturer to make up backing in accordance with their immediate needs would obviate the need of carrying in inventory a stock of colors. Apart from this convenience it will be possible for the garment or belt manufacturer to use available materials from the lay for better color matching of the backing to the facing and/or to manufacture reversible belts without the need for sending material to an outside source for the initial manufacture of the prefinished belt backing. In the overall aspect, the ability to make belt backing as required and incident to the making of the belt results in substantial economies in manufacture and reduces the ultimate cost of completed belts.

Broadly, it is an object of the present invention to provide an improved method and apparatus for manufacturing belts which realizes one or more of the aforesaid objectives. Specifically, it is within the contemplation of the present invention to provide a method and means for forming backing from a covering and filler and for assembling such backing to a facing to form a completed belt.

In accordance with method aspects of the present invention, there is provided a process for forming a backing from a covering and filler and for assembling the backing to a facing to form a completed belt which includes the steps of applying adhesive to one face of a filler and then to the other face thereof, feeding a length of covering which is wider than the filler into face to face contact with the one face of the filler preliminary to application of adhesive to the other face thereof to partially form the backing, and turning margins of the covering into face to face contact with the other face of the filler to completely form the backing leaving a band of exposed adhesive on the other face of the filler. Concurrently, a length of facing is folded to turn the opposite sides thereof inwardly and to form a point on the leading end thereof, and thereupon the facing is pressed against the band of adhesive to form a completed belt. Belts may be made in multiple units by employing a continuous supply of covering and filler material for formation of the backing and by feeding successive lengths of facing material into face to face contact with the backing as the latter is formed.

In accordance with apparatus aspects of the present invention, there is provided a machine which comprises a support having an assembly location. Guiding means are arranged along a first feed path directed towards the assembly location along which the continuous length of filler is advanced. First and second adhesive-applying heads are arranged along the feed path for applying adhesive to one face of the filler and then to the other face thereof. Provision is made for supplying a continuous length of covering which is wider than the filler into face to face contact with the one face of the filler after adhesive has been applied to said one face and in advance of the application of the adhesive to the other face of the filler. The partially formed backing is completed by provision of means along the feed path in advance of the assembly location for turning the margins of the covering into face to face contact with the other face of the filler to completely form the backing, leaving a medial band of exposed adhesive on the other face of the filler. A point-forming and side folding mechanism is arranged along a second feed path directed toward the assembly location and arranged to receive successive lengths of facing. The point-forming and side folding mechanisms turn under the opposite sides of successive lengths of facing and form the leading ends thereof into substantially V-shaped points. Conveying and pressing means are arranged to engage the completed backing and the point formed and side folded facing for pressing successive lengths of facing against the medial band of adhesive to form a plurality of belts interconnected by the continuous backing. The belts are finally completed by cutting the backing along the outline of the V-shaped point to provide separate completed belts.

The above brief description, as well as further objects, features and advantages of the present invention will be more fully appreciated by reference to the following detailed description of a presently preferred, but nonetheless illustrative embodiment of a backing and belt making machine embodying features of the present invention, when taken in conjunction with the accompanying drawings, wherein:

FIG. 3 is a sectional view taken substantially along the line 3—3 of FIG. 1 and looking in the direction of the arrows, with the point-forming and side folding mechanisms shown in its retracted or starting position;

FIG. 4 is a fragmentary plan view, partially turned back to show the successive steps performed by the machine in the initial manufacture of the backing and in the subsequent assembly thereto of the facing after the latter has had its sides folded under and a V-shaped point formed on the leading end thereof;

FIG. 5 is a fragmentary sectional view taken substantially along the lines 5—5 of FIG. 2 and looking in the direction of the arrows, showing the point-forming and side folding mechanism in a position wherein the pointed tongue has passed through the female folder to form the leading end of the facing into a V-shaped point;

FIG. 6 is a fragmentary elevational view similar to FIG. 5, showing the point-forming and side folding mechanism advanced into its forward position wherein the folded point of the facing is positioned at an assembly location for joinder or bonding to the completed belt backing;

FIG. 7 is a view similar to FIG. 6 showing the point-forming and side folding mechanism and related pressing and conveying mechanisms during the run through of a belt after formation of the point;

Figure 1:
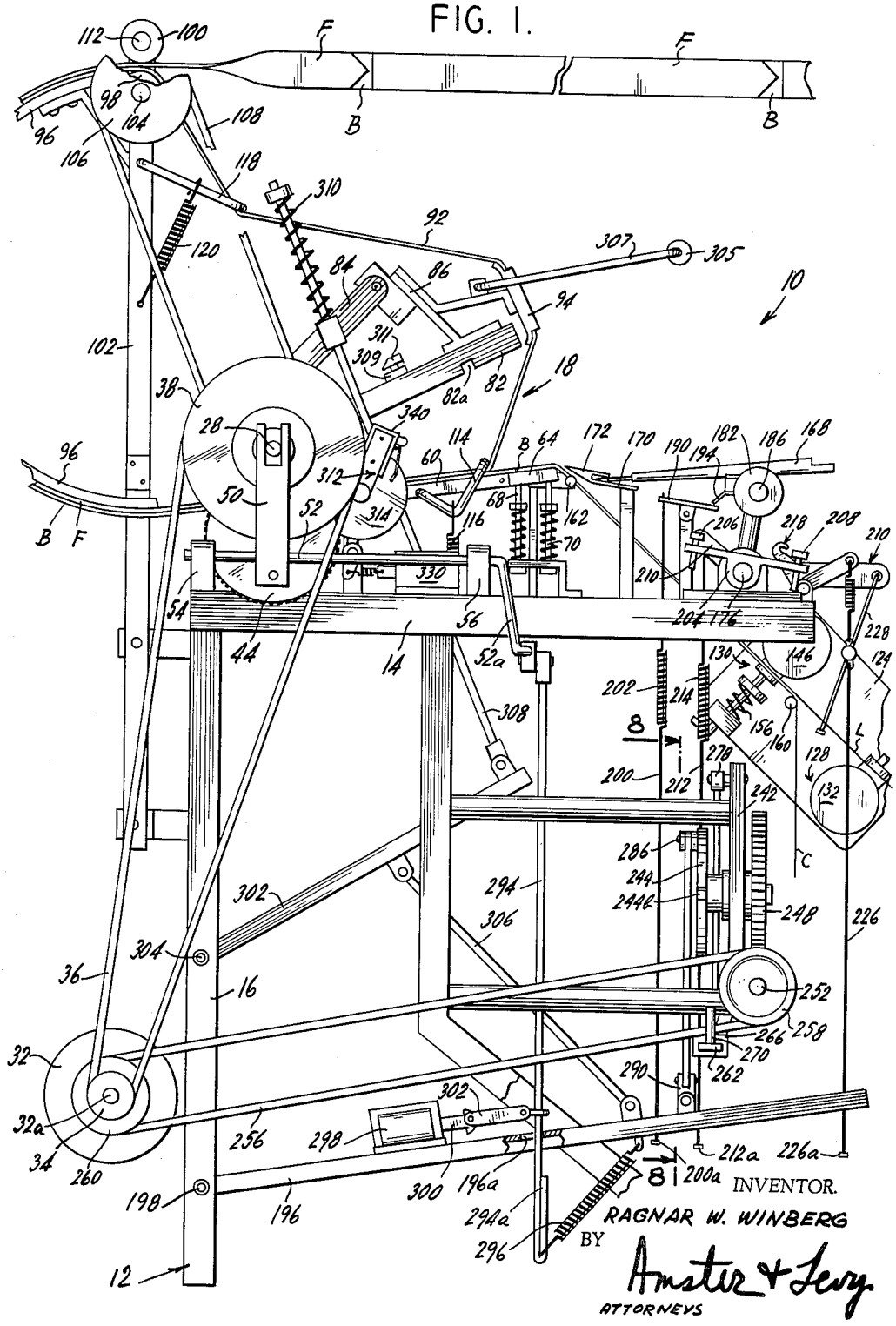
FIG. 1 is a side elevational view of an improved belt-making machine embodying features of the present invention.

Preliminary to reference to the details of the present machine, reference will be made to FIG. 4 which diagrammatically illustrates, when viewed from right to left, the successive operations performed by the present machine and in accordance with the instant method. The first step involves the application of a substantially uniform coating of adhesive over the entire bottom or under face $l_1$ of the filler or liner L, the latter being fabricated of paper or a preformed lamination of paper and other filler materials. Thereupon, at a second location in the direction of feed of the filler L toward the assembly location of the machine, a continuous length of covering C which is wider in width than the filler L is brought into face to face contact with the lower or under face $l_1$ of the filler L to partially form the ultimate backing B. The covering C may be material taken from the lay of goods and wound onto a roll, as is generally understood. Once the under face $l_1$ of the filler L is engaged by the cover C, the then under surface of the partial backing assembly will be the uncoated under face of the covering C. Thus, it is possible to urge the top or upper face $l_2$ of the filler L against an adhesive applicator for the application to such face of a coating of adhesive which is somewhat concentrated along the margins of such upper face. As the assembly of the filler L and the covering C is advanced towards the assembly location, the margins $c_1$, $c_2$ of the covering C outwardly of the corresponding edges of the filler L are turned through 180° and into contact with the heavier edge-adjacent portions of the adhesive coating on the face $l_2$. After the completion of the elemental backing as described, there is presented to the assembly location an upwardly facing medial band of adhesive M which is of a width sufficient to bond the folded under margins $f_1$, $f_2$ and the folded point $f_3$ to the underlying backing.

Referring now specifically to the remaining drawings, there is shown a typical backing and belt making machine in accordance with the present invention, which is generally designated by the reference numeral 10, and includes a support 12 having a horizontally extending bed plate 14 at table height which is supported on depending legs 16.

Mounted on the bed plate 14 of the support 12 is a pressing and conveying mechanism 18 which includes lower and upper coacting presser rollers 20, 22 (see FIG. 2) journalled one above the other for rotation about spaced horizontal axes. The lower presser roller 20 is fixed to a supporting shaft 24 which is journalled on appropriate bearings 26 at its opposite ends and the upper presser roller 22 is similarly fixed to a supporting shaft 28 which is journalled on appropriate bearings 30.

Figure 2:
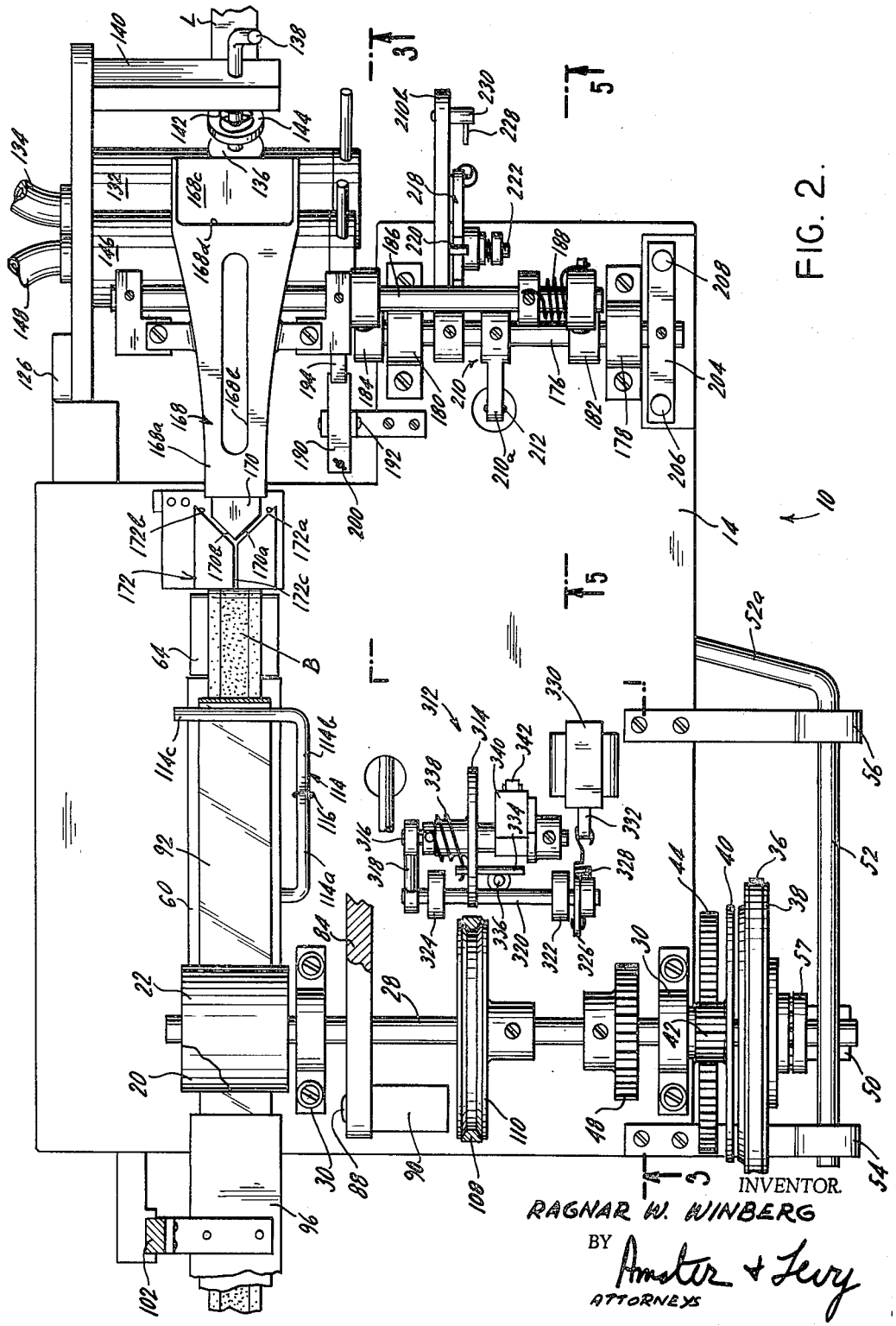
FIG. 2 is a plan view, with parts broken away and sectioned of the machine shown in FIG. 1.

Operatively connected to the presser rollers 20, 22 is a drive which includes a selectively engageable clutch, the details of which are seen best in FIGS. 1 to 3 inclusive. The drive includes a motor 32 (see FIG. 1) which is mounted beneath the bed plate 14 on the support 12 which has a drive pulley 34 fixed to its output shaft 32a. Trained about the drive pulley 34 is a V-belt 36 which is engaged about a driven pulley 38 of larger diameter which is journalled on the shaft 28 for the upper presser roller 22 for rotation about the shaft and axial displacement therealong. The pulley 38 serves as a driver element of a selectively engageable clutch which includes a driven element 40 journalled on the shaft 28. The driven element 40 has an integral gear 42 which is in meshing engagement with a further gear 44 (see FIG. 2) fixed to the shaft 24 for the lower presser roller 20 such that the lower presser roller is rotated in response to engagement of the clutch. The presser rollers 20, 22 are geared together for rotation in unison, as indicated by the direction of the arrows in FIG. 3, by the meshing gears 46, 48 fixed respectively to the shafts 24, 28. The contact faces of the clutch elements 38, 40 are provided with appropriate frictional surfaces and are brought into contact with each other to complete the drive chain from the motor 32 via the gearing 42, 44, 46, 48 to the rollers 20, 22 by means of a bifurcated or forked clutch-engaging member 50. The clutch-engaging member 50 is rockably mounted on the bed plate 14 of the support 12 by a rocker shaft 52 which is journalled on bearings 54, 56 for rocking movement in directions appropriate to selectively engage and disengage the clutch elements 38, 40. Specifically, the clutch-engaging member 50 includes opposite fingers which straddle the shaft 28 for the upper presser roller 22 and bear against the adjacent thrust bearing 57 for the clutch element or pulley 38. The rocker shaft 52 includes a crank arm 52a which is effective to rock the clutch-engaging member 50 in directions appropriate to engage and disengage the clutch elements 38, 40, as is generally understood. Provision is made for engaging and disengaging the clutch during a machine cycle, as will subsequently be described.

The pressing and conveying mechanism 18 further includes a fixed presser head 60 which is disposed at an angle to the horizontal and is directed towards the nip of the presser rollers 20, 22. The fixed presser head 60 is mounted upon the bed plate 14 by an appropriate mounting bracket 62, as seen best in FIG. 3. Projecting forwardly from the fixed presser head 60 is an extension 64 which is pivoted on the fixed presser head 60 at the pivot 66. The head extension 64 has its upper and forward leading corner chamfered, is indicated at 64a, to facilitate the smooth passage thereover of the completed backing B, as will be subsequently described. The head extension 64 is spring biased into a position substantially in alignment with the presser head 60 by a pair of mounting posts 68, 70 which support respective coil springs 72, 74 which bear adjacent their lower ends against a mounting bracket 76 and adjacent their upper ends against thrust collars 78, 80 which are fixed to the post 68, 70. The spring mounting for the head extension 64 permits the conveying and pressing mechanism 18 to accommodate to various thicknesses of materials, as will be subsequently described.

The pressing and conveying mechanism 18 further includes a movable presser head 82 which is supported on a carrier 84 via bracketing 86. The carrier 84 extends downwardly and rearwardly and has a horizontal pivot 88 (see FIG. 2) at its rearward end on a mounting standard 90 fixed to the bed plate 14. Thus, the movable presser head 82 may be pivoted from its raised or inoperative position shown in FIG. 1 to its lower or operative position shown in FIGS. 5 to 7 inclusive. The coordinated movement of the upper presser head 82 from its inoperative to operative positions during the machine cycle will be subsequently described.

Cooperating with the fixed lower presser head 60 and the moveable upper presser head 82 is an endless conveyor 92 which is fabricated of a heat-resistant material and is trained about appropriate guides such that the same is sandwiched between the head 60, 82 and moves longitudinally thereof to advance the assembly of the belt backing B and the belt facing F through the machine and through an adequate heating and pressing cycle to assure the joinder of the folded facing to the backing. The conveyor 92 is guided for movement along a prescribed course in relation to the presser head 60, 82 by the provision of plural guides including the forward conveyor guide 94 fixed to the mounting bracket 86 and the elongated arcuate rearward conveyor guide 96 fixed to the standard 102 and extending through an arc of approximately 180°. The guide 96 provides a reaction force to the pressure exerted by the conveyor belt 92 to assure the perfect adherance of the facing F to the backing B after being subjected, in succession to the coacting presser heads 60, 82 and rollers 20, 22. The rearward conveyor guide 96 directs the completed belts, which are interconnected end to end due to the continuous backing B, between a pair of output rollers 98, 100 which are mounted on the standard 102 fixed to the rear of the support 12. The lower output roller 98 is journalled on a stub shaft 104 and is connected to a pulley 106 which is coupled by a V-belt 108 to a driver pulley 110 fixed to the upper roller shaft 28, as seen best in FIGS. 2 and 3. The upper output roller 100 is journalled on a stub shaft 112 fixed to the standard 102, with the spacing between the rollers 98, 100 being such as to impart a pull to the facing and backing which thereby advances the successive completed belts through the machine.

Appropriate means are provided for maintaining the conveyor 92 under tension and in contact respectively with the fixed presser head 60 and the guides 94, 96, with the conveyor 92 passing between the nip of the output rollers 98, 100. Specifically, and as seen best in FIGS. 5 to 7 inclusive, an L-shaped tensioning member 114, including two arms 114a, 114b extending at right angles to each other, has a pivotal mount at the end of the arm 114a on the fixed lower presser head 60. The arm 114b terminates in an inturned end 114c (see FIG. 2) which overlies the lower run of the conveyor 92. Intermediate the arm 114a, 114b, there is connected a tensioning spring 116 which is anchored on the bed plate 14 and biases the tensioning member 114 in a downward direction to urge the underlying portion of the belt 92 against the fixed presser head 60 contiguous to the forward end thereof. It should be noted that the upper movable presser head 82 is cut away, as indicated at 82a, to provide the necessary clearance for the inturned end 114c of the tensioning member 114. A further tensioning member 118 (see FIG. 1) is pivotally mounted on the standard 102 and is engaged over the upper run of the conveyor 92, with a spring 120 being connected to the tensioning member 118 and anchored on the standard 102 to further tension the conveyor 92.

When the upper movable presser head 82 is in its operative position, as seen in FIGS. 5 to 7 inclusive, the conveyor 92 is urged against the pivoted or floating extension 64 of the fixed lower pressure head 60. The lower end of the forward conveyor guide 94 is curved and cooperates with the upper chamfered corner 64a of the extension 64 to define an assembly location A at which the facing F, with the point thereof formed and the sides folded, is brought into face to face relation with the medial band of exposed adhesive on the contiguous or upper face of the backing B.

Extending upwardly and forwardly toward the assembly or pick-up location A, there is provided backing assembly mechanisms, generally designated by the reference numeral 122, for joining the filler or liner L to the covering C, with the covering C wrapped about the under face $l_1$ of the filler L and having its opposite margins $c_1$ and $c_2$ turned over into contact with the upper face $l_2$ of the filler L. The backing assembly mechanisms 122 include a vertically extending mounting plate 124 which is suspended forwardly of the feed bed 14 on an appropriate mounting bracket 126. On the plate 124 there is mounted a first or lower adhesive-applying head 128 which is arranged to coat the lower or under face $f_1$ of the filler L with a layer of an appropriate adhesive of substantially uniform thickness from side to side and throughout the length thereof and a second or upper adhesive-applying head 130 which is arranged along the feed path of the backing-forming materials towards the assembly location A and is arranged to apply a coating of adhesive on the upper face $l_2$ of the filler or lining. Preferably, the adhesive coating applied to the upper face $l_2$ of the filler L is heaviest along the opposite edges thereof for a width corresponding substantially to that of the inturned margins or edges $c_1$, $c_2$ of the covering C, as indicated in FIG. 4.

The lower adhesive-applying head 128 includes an elongated cylindrical reservoir 132 which is connected via an adhesive inlet pipe 134 to an appropriate source of adhesive which may be gravity or force fed. The reservoir 132 includes an upwardly directed discharge nozzle 132a which is formed with an orifice facing the underside of the filler L. The orifice is of the width and length to assure the desired application of the adhesive to such lower or under face $l_1$. The filler L is maintained against the discharge nozzle 132a by a back-up plate 136 which is spring biased thereagainst by a centrally-engaged holding member 138 which extends slidably through a mounting block 140 fixed to the plate 124. The holding member 138 includes a spring-supporting section 138a extending axially of the nozzle 132a and a handle section 138b extending at right angles to the spring-supporting section 138a. A coil spring 142 encircles the spring-supporting section 138a and bears against the mounting block 140 and a stop collar 144 thereby exerting spring tension against the back-up plate 136 in accordance with the adjusted position of the holding member 138 relative to its mounting block 140. At such times as it becomes necessary to clean the reservoir 132 and/or the nozzle 132a, it is a relatively simple matter to retract the holding member 138 by grasping the handle section 138b to move the same away and to facilitate the removal of the floating back-up plate or member 136.

The upper adhesive-applying head 130 is of similar construction and includes a reservoir 146 which is disposed above the filler or liner L and includes a downwardly directed nozzle 146a. The reservoir 146 is connected to a source of adhesive under pressure or which is fed by gravity via the inlet pipe 148. Disposed opposite the nozzle 146a is a back-up plate 150 which has a domed or curved face 150a which contacts the adjacent undersurface of the covering C. The curvature of the dome-shaped face 150a is such that a somewhat heavier layer of adhesive is applied to the upper face $l_2$ of the liner L contiguous to the margins thereof at the locations where the covering C has its margins $c_1$, $c_2$ turned inwardly.

The back-up plate 150 is held against the two plies of material as they pass beneath the nozzle 146a by the provision of a holding member 152 which is slidably mounted on a mounting block 154 and carries a coil spring 156 bearing against the shoulder or stop collar 158.

Intermediate the adhesive-applying heads 128, 130 and along the first feed path directed toward the assembly location A, there is provided a guide roller 160 over which the cover C is trained such that the latter may pass into contact with the adhesive applied under face $l_1$ of the filler L. Provision may be made for laterally guiding the covering C, as by providing shoulders on the roller 160.

Disposed along the first feed path for the backing B just in advance of the head extension 64, there is provided a margin-turning member 162 which is mounted on a supporting bracket 164 on the bed plate 14 and includes a central section 162a which is of a width corresponding substantially to the width of the final belt backing and spaced margin-engaging walls 162b, 162c (see FIG 4) which are effective, in conjunction with the curved forward end 64a of the head extension 64, to turn the margins $c_1$, $c_2$ into contact with the somewhat heavier coatings of the adhesive contiguous to the margins of the upper face $l_2$ of the filler L.

The side turning and point-forming mechanism, which is of generally known construction and designated by the reference numeral 166, includes the side folder 168 which is constructed to turn under the opposite sides $f_1$, $f_2$ of the belt facing F under when fed therethrough. As seen best in FIG. 2, the side folder 168 includes an elongated folder body 168a which is formed with an elongated slot 168b which facilitates the initial threading therethrough of the forward end of successive lengths of belt facing F and a flange 168c at the trailing end thereof which leads into a flared mouth 168d. The flange 168c has its opposite sides turned upwardly to laterally confine the fabric as it is introduced into the flared mouth 168d for feed of the fabric through the side folder.

Projecting forwardly of the side folder 168 is a male point-forming member 170 which terminates in a V-shaped pointer tongue have fold-forming edges 170a, 170b. The male point-forming member 170 cooperates with a female point-forming member 172 which is mounted on a bracket 174 fixed to the bed plate 14. The female point-forming member 172 includes fold-forming edges 172a, 172b which meet at an apex opening into the leading end of a medial throat 172c.

The coaction of the elements of the side turning and point-forming mechanism 168, 172 will be best appreciated by progressively referring to FIGS. 3 and 5 to 7 inclusive. Normally the male point-forming member 170 has its fold-forming edges disposed below the complementary fold-forming edges of the female point-forming member 172, as shown in FIG. 3. When the operator inserts a length of belt facing F into the mouth 168d and advances the leading end of the length over the V-shaped point-forming member or tongue 170, the fabric may be disposed beneath the complementary fold-forming edges of the female point-forming member, as shown in FIG. 3. Thereupon, the male point-forming member 170 is displaced upwardly and then forwardly relative to the female point-forming member 172 such that the respective cooperating fold-forming edges turn the leading end of the length of belt facing under, with the resulting overlap folds being disposed angularly relative to each other to provide the V-shaped point. Upon completion of the forward thrust of the male point-forming tongue or member 170, the leading end of the length of belt facing F is folded into a point and advanced to the assembly location A for joinder to the length of belt backing B.

The assembly of the side folder 168 and the male point-forming member 170 are mounted for upward movement relative to the female point-forming member 172 and for a forward thrust relative thereto by provision of a carrier shaft 176 which is journalled on the bed plate 14 of the machine by bearings 178, 180 (see FIG. 2). Fixed to and projecting upwardly from the carrier shaft 176 are a pair of carrier arms 182, 184 which are of identical structure. The arms 182, 184 are formed at their respective lower ends with hubs which encircle and are secured to the carrier shaft 176 and are formed at their upper ends with bearings which rotatably mount a folder rocker shaft 186. The folder rocker shaft 186 carries the assembly of the folder 168 and the male point-folding member 170 and permits pivotal movement thereof from the starting position illustrated in FIG. 3 in the clockwise direction to the point-forming position illustrated in FIG. 5. This is followed by rocking movement of the entire assembly on the carrier shaft 176, as may be appreciated by progressively inspecting FIGS. 5 and 6, to thrust the male point-forming member 170 forwardly relative to the female point-forming member 172 and into a position wherein the leading pointed end of the length of fabric F is at the assembly location A for joinder to the belt backing B.

The assembly of the side folder 168 and the male point-forming member 170 is urged into the starting position illustrated in FIGS. 2 and 3 by provision of a coil spring 188 which encircles the folder rocker shaft 186 and is operatively connected between the arm 182 and the shaft 186, as seen best in FIG. 2.

Respective actuating means are connected to the side-turning and point-forming mechanism 166 for effecting sequential operation of the components thereof. The actuating means includes a first actuating lever 190 which is pivotally mounted on the support at 192 intermediate its ends. One arm of the lever 190 engages an actuating finger 194 which is fixed to the side folder 166 and the other arm of the lever 190 is operatively connected to a main control lever 196 which extends fore and aft of the machine and is pivotally mounted on the support 12 at a main control pivot 198, with the operative connection therebetween being provided by a connecting link 200 which includes a spring 202. A position-limiting lever 204 is fixed to the folder-carrying shaft 176 intermediate its ends and is provided with adjustable stops 206, 208 at the opposite ends thereof. It will be appreciated that the adjustable stop 208 establishes the rearward position for the side-turning and point-forming mechanism 166 while the adjustable stop 206 establishes the forward position thereof. A second actuating lever 210 is operatively connected to the main control lever 196 by a connecting link 212 which incorporates a spring 214 therein. As the main control lever 196 turns in the clockwise direction about the main control pivot 198, an operative connection is provided when the head 200a on the lower end of the link 200 contacts the undersurface of the lever 196 and rocks the side folder 168 through the upward arc relative to the female point-forming member 172. This is followed by the requisite forward thrust when the stop 212a on the lower end of the connecting link 212 abuts the undersurface of the main control lever 196. The actuating means further includes a double arm folder-positioning lever 218 having an arm 218a terminating in a hook which is adapted to contact a positioning pin 220 on the arm 210b of the second actuating lever 210. Provision is made to somewhat retract the side folder 168 and the male point-forming member 170 during the making of a belt to permit the unobstructed feed of the folded facing F into contact with the belt B at the assembly location A. In this connection, the folder-positioning lever 218 is pivotally mounted at 220, with a friction bearing 224 being provided to maintain successive established positions for the lever 218. During the withdrawal of the male point-forming member or tongue 170, as may be seen by comparing FIGS. 6 and 7, it will be appreciated that the springs 72, 74 hold the pointed end $f_3$ of the facing F in position for assembly with the backing B. The arm 218b is coupled via a spring 224 to a connecting link 226 which is coupled to the main control lever 196. The length of the connecting link 226 is greater than that of the connecting links 200, 212 such that the head 226a thereof contacts the main control lever 196 at a time after the side folder 168 is advanced to the operative or running position shown in FIG. 6. The arm 210b of the auxiliary actuating lever 210 is connected via a coupling link 228 to the connecting link 226, with the link 228 having a pivotal connection 230 to the arm 210b and a slidable connection through the coupling head 232 to link 226. As may be appreciated by progressively inspecting FIGS. 5 and 6, the sliding interconnection between the coupling link 228 and the coupling head 232 permits the rocking movement of the auxiliary lever 210 about the shaft 176, without affecting the adjusted position of the folder-positioning lever 218 as determined by the friction bearing 224. Upon a downwardly directing pull being exerted on the connecting link 226, there is a tendency for the auxiliary lever 210 to turn such that the arm 210b thereof swings in the clockwise direction. Concurrently, the hooked end of the folder-positioning lever 218 engages the positioning pin 220 to thereby establish the running position for the side folder and to lock the same in such running position. When the tension is released on the connecting link 212, the auxiliary lever 210 moves to the position illustrated in FIG. 5 and the folder-positioning lever 218 is restored to the position illustrated in FIG. 5.

Figure 8:
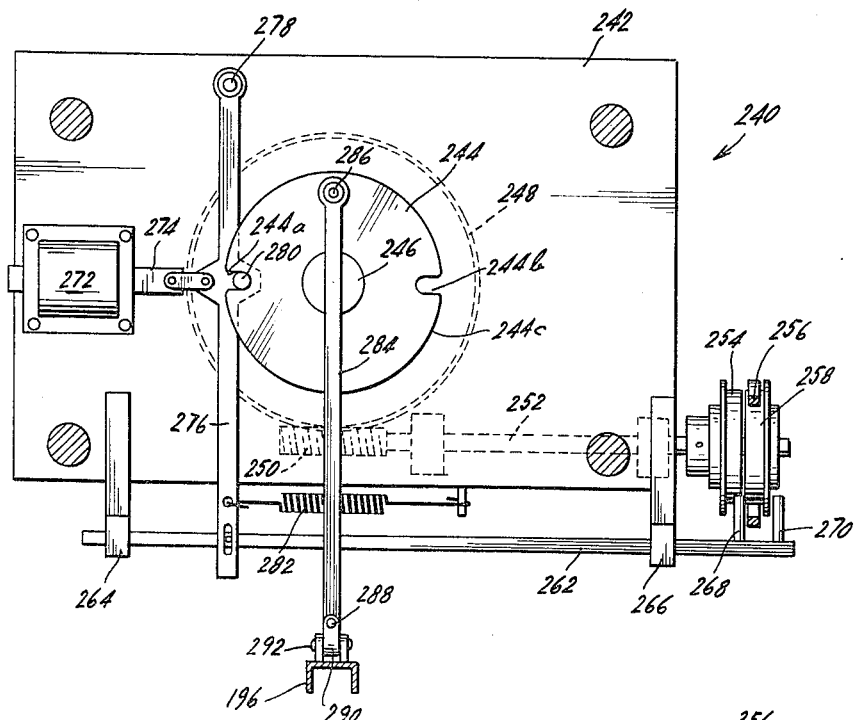
FIG. 8 is a sectional view taken substantially along the line 8—8 of FIG. 1 and showing details of part of the control embodied in the instant machine.

The required sequence of operations for the several elements of the point-forming and side-folding mechanism 166 and for the pressing and conveying mechanism 18 is achieved by the provision of a machine control, generally designated by the reference numeral 240, which is mounted on the machine frame or stand 12 by the provision of a mounting plate 242 secured across the front of the machine. The details of the machine control 240 are best appreciated by reference to FIGS. 1 and 8 wherein the control is seen to include a control cam 244 which is formed with diametrically opposed seating notches 244a, 244b on the periphery 244c thereof. The control cam 244 is journalled on a control shaft 246 which is connected to a worm gear 248 which is driven from a worm 250 carried on a worm shaft 252 journalled on the plate 242. The worm shaft 252 carries a pulley 254 which is driven when a belt 256 is shifted into engagement therewith, as will be subsequently described. Loosely journalled on the worm shaft 252 is an idler pulley 258 over which the belt 256 is normally trained, with the belt 256 extending about a drive pulley 260 on the motor shaft 32a, as seen in FIG. 1. The belt 256 is shifted into engagement with the pulley 254 to impart drive to the control cam 244 under control of a shift bar 262 which is slidably mounted on bearings 264, 266 on the plate 242. The shift bar 262 carries a pair of fingers 268, 270 which straddle opposite sides of the belt 256 and are capable of laterally shifting the belt in response to reciprocation of the shift bar 262. The shift bar 262 is reciprocated by a control-engaging solenoid 272 which has its plunger 274 coupled to a shift lever 276 which is pivoted on the plate 242 at 278 and has a pin-and-slot connection at its lower end to the shift bar 262. The shift lever 276 carries a cam-positioning pin 280 which is normally seated in the notch 244a and is held therein by a spring 282 which is connected to the lever 276 and is anchored on the plate 242. At such time as the control-engaging solenoid 272 is energized the plunger 274 will rock the lever 276 in a direction to move the cam-positioning pin 280 to a clearance position relative to the seating notch 244a such that the pin 280 will ride on the periphery 244c of the control cam 244 as the latter is rotated. Simultaneously, the shift bar 262 is translated in a direction to engage the belt 256 onto the pulley 254 which in turn imparts drive via the worm shaft 252, the worm 250 and the worm gear 248 to the control shaft 246 and to the control cam 244 which will thereby rotate the same in the clockwise direction, as indicated by the direction of the arrow in FIG. 8. This clockwise movement is imparted via the control rod 284 to the main control lever 196. The control rod 284 has a pivotal connection 286 at its upper end to the control cam or eccentric 244 and a pivotal connection 288 at its lower end to a yoke 290 which is pivotally connected to the control lever 196 at a further pivotal connection 292. It will be appreciated that as the control member 244 rotates in the clockwise direction, a downward thrust is imparted via the control rod 284 to the main control lever 196 which will from the starting position illustrated in FIG. 1 through a downward arc in a clockwise direction about the main control pivot 198 to achieve the coordinating movements of the several components of the machine, as will be described. At such time as the cam-positioning pin 282 seats itself in the notch 244b, the main control lever 196 will be in its lowermost position of arcuate travel and will be held therein until such time as the control-engaging solenoid 272 receives a further energizing pulse. When the pin 280 seats itself in the notch 244b under control of the biasing spring 282, the drive belt 256 will be shifted onto the idler pulley 258 to disrupt turning movement of the control cam 244.

The control functions which are initiated from the main control lever 196 include the downwardly directed pulls imparted in sequence to the connecting links 200, 212, 226 and the corresponding movements of the point-forming and side-folding mechanism 166. In addition, and as seen best in FIG. 1, the crank arm 52a of the rocker shaft 52 is connected at its upper end to an actuating rod 294 which extends through a cut-out 196a in the main control lever 196 and is formed at its lower end with a lever-engaging shoulder or abutment 294a. The actuating rod 294 is biased against one wall of the cut-out 196a by a spring 296 which is connected to the control lever 196 at a location appropriate to bias the actuating rod 294 into a position wherein the ledge contiguous to the cut-out 196a will abut the shoulder or abutment 294a to engage the clutch elements 38, 40 at the appropriate time during the machine cycle. Such abutment does not occur until such time as the point-forming operation has been completed and the pointed leading end of the facing F is advanced into the assembly location A. Provision is made for disengaging the clutch elements 38, 40 by virtue of a clutch-releasing solenoid 298 which has its plunger 300 coupled via link 302 to the actuating rod 294 such that it will disengage the clutch elements 38, 40 at the appropriate time during the machine cycle, as will subsequently be described.

The main control lever 196 is connected to an auxiliary control lever 302 (see FIG. 1) which is pivoted on the support at 304. The auxiliary control lever 302 is connected to the main control lever 196 via a link 306 and also is connected via a link 308 to the carrier 84 for the upper presser head 82. Provision is made for backing up the movable presser head 82 with a spring pressure, as by the provision of the coil spring 310 on the connecting link 308 which is urged against the carrier 84.

A run-out detector 305 is mounted on the bracket 86 for the movable presser head 82 by an arm 307, with the run-out detector 305 being adapted to contact the side folder 168 to complete a ground connection for the secondary of a step down transformer 356 incorporated into the control, as will be described in connection with FIG. 9.

Provision is made for imparting heat to the movable presser head 82 which may be in the form of a conventional heater element 309 mounted on the presser head 82 and incorporates a control 311 for adjusting the degree of heat in accordance with the types of materials and adhesive being employed to fabricate the belt. The heater 309 is energized at such time as the main switch to the machine is thrown, as will be subsequently described.

The control still further includes an electromechanical timing mechanism, which after a predetermined running interval for the machine during which the length of the belt facing F is bonded or laminated to the backing B, will return the machine components to the starting position for the next belt and backing making cycle. The running interval must be adjusted in accordance with the length of successive belts being made and to establish a minimum spacing between the trailing end of one belt and the leading pointed end of the next belt, as may be appreciated by inspecting FIG. 4. The electromechanical timing mechanism, which is generally designated by the reference numeral 312, is effective for a run-out interval or period which is initiated when the sensor roller or run-out detector 305 contacts the electrically conductive side folder 168 as the trailing end of the belt facing F passes through the side folder 168. The mechanism 312 includes a run-out disc 314 which is loosely journalled on a central stub shaft 316 which is mounted on a carrier arm 318 fixed to a carrier shaft 320 journalled on the bed plate 14 by bearings 322, 324 (see FIG. 2). An actuating lever 326 is connected to the shaft 320 and is coupled via spring 328 to the plunger 32 of the solenoid 330 which is energized as will be hereinafter described under control of the sensor 305. Upon energization of the solenoid 330, the lever 326 will be rotated in the counterclockwise direction, as viewed in FIG. 3, to urge the run-out disc 314 from the full line position to the broken line position wherein the same is in contact with the belt 108 trained about the pulley 110 to thereby rotate the run-out disc 314 in the counterclockwise direction. The loosely journalled run-out disc 314 carries a switch-actuating pin 334 which is urged against a fixed stop 336 by a coil spring 338 wrapped about the hub of the disc 314 and having its opposite ends connected respectively to the shaft 316 and to the disc 314. A control switch 340 is adjustably mounted on the shaft 316, with the switch actuator 342 being positioned to be contacted by the switch-actuating pin 334 in response to rotation of the run-out disc 314 through an angular traverse corresponding to the spacing between the pin 334 and the switch actuator 342. This angular traverse can be adjusted to lengthen or shorten the run-out interval or period as sensed by the roller 305 by adjusting the angular position of the switch 340 and the switch actuator 342. As the switch 340 is swung in the counterclockwise direction away from the switch-actuating pin 334, the run-out interval which is initiated after the trailing end of the facing F leaves the side folder 168 will be correspondingly lengthened; and when the switch 340 is swung to a new adjusted position in the clockwise direction closer to the pin 334, there will be a corresponding shortening of this run-out interval or period.

Figure 9:
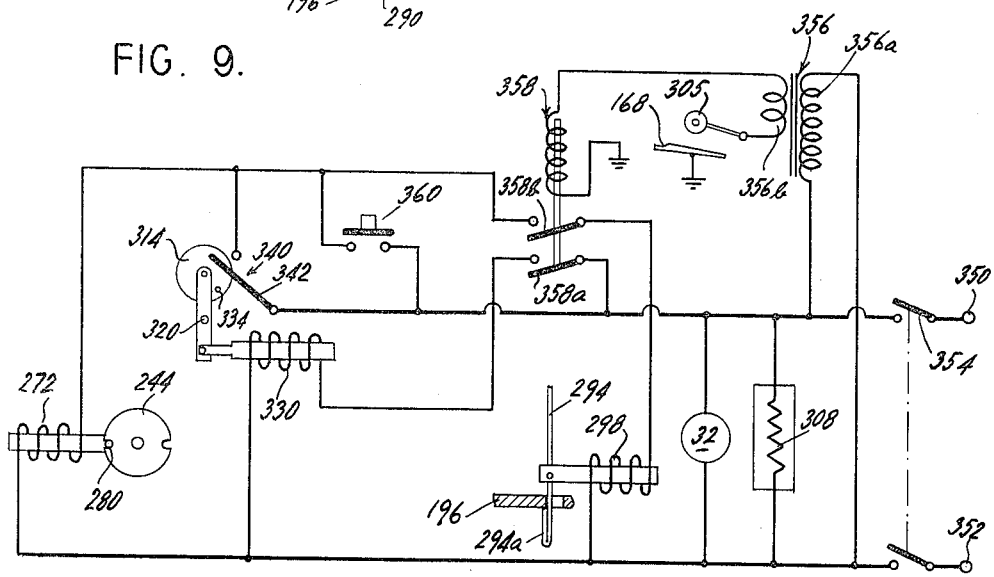
FIG. 9 is a schematic and diagrammatic view showing the interconnection of the several controls incorporated in the instant belt-making machine.

Referring now to FIG. 9, there is shown in schematic and diagrammatic form the interconnection of the several controls incorporated in the present backing and belt making machine. Power is derived from input lines 350, 352 over a double pole, single throw main switch 354 and supplied to the main motor 32 and to the heater 308 in the upper presser head. Further, power is applied to the primary 356a of the step down transformer 356 which has its secondary 356b connected to ground over the sensor roller 305 and the conductive side folder 168, with the circuit normally being opened due to the interposed fabric of the facing F. The secondary of the step down transformer 356 is connected to a relay 358 which has two contacts 358a, 358b. The contact 358a is connected to the energization coil of the solenoid 298 and to the energization coil of the solenoid 272, while the contact 358b is connected from the line 350 to the energization coil of the solenoid 330. The actuator 342 for the switch 340 is connected in the line 350 in the circuit for the coil of the solenoid 272. Connected across the switch 340 is a starting push button 360.

A typical sequence of operation will now be described to facilitate a more thorough understanding of the present invention:

The double pole single throw main switch 354 is closed to place the input lines 350, 352 across the motor 32 and the heater 308 and to condition the control illustrated in FIG. 9. The operator manually loads the machine with a length of belt facing F by inserting the same through the mouth 168d of the side folder 168 and advancing the same such that the fabric overlies the male pointer tongue 170. Of course it is necessary to prethread the belt-making mechanisms 122 with an appropriate supply of the filler or liner L and covering C and to advance the starting end of the completed backing B through the machine in a preliminary operation. When the machine operator depresses the push button 360, an energization circuit is completed for the coil of the solenoid 272, as seen in FIG. 9, to disengage the pin 280 from the control cam 244 and to impart drive to the control cam 244 via the driven belt 256 which is shifted onto the pulley 254. As the control cam 244 rotates in the clockwise direction, as indicated by the directional arrow, the main control or operating lever 196 is swung through a downward arc about its pivot 198. Such downward movement first causes a pull to be exerted on the connecting link 200 which pivots the side folder 168 from the position illustrated in FIGS. 1 and 3 to that shown in FIG. 5 to permit the formation of the V-shaped point $f_3$ on the forward end of the facing F. None of the other components of the side-folding and point-forming mechanism 166 are placed into operation and there is a lost motion travel of the main control lever 196 relative thereto. Next the main control lever 196 abuts the stop 212a and exerts a downwardly directed pull on the arm 210a of the actuating lever 210 which thrusts the folded end of the fabric F towards the assembly location A. Simultaneous with or in advance of this operation, the abutment ledge defined by the clutch control lever 196 contiguous to the cut-out 196a contacts the shoulder 294a on the actuating rod 294 and actuates the clutch-engaging member 50 to engage the clutch and impart drive to the lower and upper presser rollers, 20, 22 and to the conveyor 96. Concurrently, the auxiliary control lever 302 which is coupled to the main control lever 196 is operative via the connecting link 300 to move the upper presser head 82 from its inoperative or retracted position shown in FIG. 1 to the operative position shown in FIGS. 5 and 6. The timing is such that as the V-shaped pointed leading end of the folded facing F enters the assembly location A, the same comes into engagement with the moving conveyor 96 and is advanced between the coacting presser heads 60, 82. Thereupon, the male point-forming member or tongue 170 is retracted to the running positions illustrated in FIG. 7 and run through of the length of the belt as determined by the length of the facing F proceeds. Throughout the running interval or period, the conductive sensing roller 305 is in its operative position overlying the fabric F and is insulated from the grounded side folder 168. When the trailing end of the belt leaves the side folder 168 and passes beyond the sensing roller 305, a signal is derived which initiates a run-out interval or period. The length of this interval is usually fixed and determined by the spacing between the location of the sensing roller 305 and the assembly location A, taking into account the desired spacing between successive belts. Referring to FIG. 9, it is seen that when the sensing roller 304 contacts the folder 168, the energization circuit for the coil of the relay 358 is completed to close the relay contacts 358a, 358b. The closing of the contact 358a completes the energization circuit for the solenoid 330 and conditions the energization circuits for the solenoids 272, 298 it being noted that the switch 340 provides an open circuit in the energization circuit for both of the solenoids 272, 298. When the solenoid 330 is energized, the run-out disc 314 is moved from the full-line inoperative position shown in FIG. 3 to the dot-dash operative position shown therein and into contact with the belt 108 to thereby commence the timing of a run-out interval which may be adjusted in length as previously described. At the end of the run-out interval, the switch-actuating pin 334 contacts the switch actuator 342 and completes the energization circuits for the coils of the solenoids 272, 298. Energization of the coil of the solenoid 298 disengages the shoulder 294a of the actuating rod 294 from beneath the ledge defined by the main control lever 196 and disengages the clutch elements 38, 40 to disrupt drive to the presser rollers 20, 22 and the conveyor 96. Energization of the solenoid 272 retracts the pin 244b from the notch 244 and commences a further 180° of rotation for the control cam 244 which is effective to rock the main control lever 196 in the counterclockwise direction about its pivot 198 and permits restoration of the components of the side folding and point-forming mechanism 166 to the starting position illustrated in FIGS. 1 and 3. During the reverse sequence of movements, the illustrated intercontrols between the components of the side-folding and point-forming mechanism 166 assure the proper sequence of movement of such components to the retracted or starting position.

From the foregoing, it will be appreciated that there has been provided in accordance with the present invention an improved method and mechanisms for the substantially automatic manufacture of belt backing and for the joinder of such belt backing to a belt facing, with the latter being formed into the basic configuration of the belt. The operation of the machine merely requires the attendance of an operator to insert the facing F into the side folder and to depress the start push button 360 whereupon the machine will automatically go through a complete cycle and restore itself to the starting or loading position. Obviously during the running period or interval of the machine, an operator is free to load another machine of similar construction or perform a related operation, such as cutting the backing B along the outline of the V-shaped point of the facing F to separate successive belts. The practical advantages of the machine and method are manifested and it will be appreciated that substantial savings in cost will be realized with the present equipment, quite apart from the flexibility afforded by the facility of manufacturing backing as required.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What I claim is:

1. A method for forming backing from a covering and filler and for assembling said backing to a facing to form a belt including the steps of applying adhesive to one face of a filler and then to the other face of said filler, feeding a length of covering which is wider than said filler into face to face contact with said one face of said filler to partially form said backing, turning margins of said covering into face to face contact with said other face of said filler to completely form said backing leaving a band of exposed adhesive on said other face of said filler, folding a length of facing to form a point on the leading end thereof, and pressing said facing against said band of adhesive to form a belt.

2. A method for forming backing from a covering and filler and for assembling said backing to a facing to form a belt including the steps of applying adhesive to one face of a filler and then to the other face of said filler, feeding a continuous length of covering which is wider than said filler into face to face contact with said one face of said filler to partially form said backing, turning margins of said covering into face to face contact with said other face of said filler to completely form said backing leaving a medial band of exposed adhesive in said other face of said filler, folding a length of facing to turn the opposite side thereof inwardly and to form a point on the leading end thereof, and pressing said facing against said medial band of adhesive to form a belt.

3. A method for forming a continuous backing from a covering and filler and for assembling said backing to plural facings in succession to form a belt including the steps of applying adhesive to one face of a filler and then to the other face of said filler, feeding a continuous length of covering which is wider than said filler into face to face contact with said one face of said filler in advance of the application of adhesive to the other face thereof to partially form said backing, turning margins of said covering into face to face contact with said other face of said filler to completely form said backing leaving a medial band of exposed adhesive on said other face of said filler, folding successive lengths of facing to turn the opposite sides thereof inwardly and to form points on the leading end thereof, and feeding the lengths of facing in succession and in spaced end to end relation against the medial band of adhesive to form plural belts arranged end to end and interconnected by said continuous backing.

4. A method for forming a continuous backing from a covering and filler and for assembling said backing to plural facings in succession to form a belt including the steps of applying adhesive to one face of a filler and then to the other face of said filler, feeding a continuous length of covering which is wider than said filler into face to face contact with said one face of said filler to partially form said backing, turning margins of said covering into face to face contact with said other face of said filler to completely form said backing leaving a medial band of exposed adhesive on said other face of said filler, folding successive lengths of facing to turn the opposite sides thereof inwardly and to form points on the leading end thereof, feeding the lengths of facing in succession and in spaced end to end relation against the medial band of adhesive to form plural belts arranged end to end and interconnected by said continuous backing, and cutting said backing intermediate successive belts and along the pointed ends of said facings to form individual belts.

5. A method for forming a continuous backing from a covering and filler including the steps of applying adhesive to one face of a filler and then to the other face of said filler, feeding a continuous length of covering which is wider than said filler into face to face contact with said one face of said filler to partially form said backing, and turning margins of said covering into face to face contact with said other face of said filler to completely form said backing leaving a medial band of exposed adhesive on said other face of said filler.

6. A machine for forming backing from a covering and filler and for assembling said backing to a facing to form a belt comprising a support having an assembly location, guiding means arranged along a first feed path directed toward said assembly location along which a continuous length of said filler is advanced, a first adhesive-applying head along said first feed path for applying adhesive to one face of said filler, a second adhesive-applying head along said first feed path for applying adhesive to the other face of said filler, means for supplying a continuous length of covering which is wider than said filler into face to face contact with said one face of said filler in advance of said second adhesive-applying head to partially form said backing, means along said first feed path for turning margins of said covering into face to face contact with said other face of said filler to completely form said backing leaving a medial band of exposed adhesive on said other face of said filler, a point-forming and side-folding mechanism arranged along a second feed path directed toward said assembly location along which successive lengths of facing are advanced, and conveying and pressing means arranged to engage said completed backing and the point-formed and side-folded facing for pressing said facing against said medial band of adhesive to form a belt.

7. A machine for forming backing from a covering and filler and for assembling said backing to a facing to form a belt comprising a support having an assembly location, guiding means arranged along a first feed path directed toward said assembly location along which a continuous length of said filler is advanced, a first adhesive-applying head along said first feed path for applying adhesive to one face of said filler, a second adhesive-applying head along said first feed path for applying adhesive to the other face of said filler, said second adhesive-applying head being disposed along said first feed path between said first adhesive-applying head and said assembly location, means for supplying a continuous length of covering which is wider than said filler into face to face contact with said one face of said filler in advance of said second adhesive-applying head to partially form said backing, means along said first feed path intermediate said second adhesive-applying head and said assembly location for turning margins of said covering into face to face contact with said other face of said filler to completely form said backing leaving a medial band of exposed adhesive on said other face of said filler, a point-forming and side-folding mechanism arranged along a second feed path directed toward said assembly location along which successive lengths of facing are advanced, and conveying and pressing means arranged to engage said completed backing and the point-formed and side-folded facing for pressing said facing against said medial band of adhesive to form a belt.

8. A machine for forming backing from a covering and filler and for assembling said backing to a facing to form a belt comprising a support having an assembly location, a first adhesive-applying head for applying adhesive to one face of a filler as the latter is advanced along a first feed path, a second adhesive-applying head along said first feed path for applying adhesive to the other face of said filler, means for supplying a continuous length of covering which is wider than said filler into face to face contact with said one face of said filler to partially form said backing, means along said first feed path for turning margins of said covering into face to face contact with said other face of said filler to completely form said backing leaving a band of exposed adhesive on said other face of said filler, a point-forming and side-folding mechanism arranged along a second feed path directed toward said assembly location along which successive lengths of facing are advanced, said mechanism including a stationary female point-forming element and a male point-forming element cooperating with said female point-forming element and movable relative thereto to advance the formed facing to said assembly location, and a combined conveying and pressing mechanism for pressing said backing and facing against each other and for pulling the assembly through the assembly location for completing a belt.

9. A machine for forming backing from a covering and filler and for assembling said backing to a facing to form a belt comrising a support having an assembly location, a first adhesive-applying head for applying adhesive to one face of a filler as the latter is advanced along a first feed path toward said assembly location, a second adhesive-applying head along said first feed path for applying adhesive to the other face of said filler, said second adhesive-applying head being disposed along said first feed path between said first adhesive-applying head and said assembly location, means for supplying a continuous length of covering which is wider than said filler into face to face contact with said one face of said filler in advance of said second adhesive-applying head to partially form said backing, means along said first feed path intermediate said second adhesive-applying head and said assembly location for turning margins of said covering into face to face contact with said other face of said filler to completely form said backing leaving a medial band of exposed adhesive on said other face of said filler, a point-forming and side-folding mechanism arranged along a second feed path directed toward said assembly location along which successive lengths of facing are advanced, said mechanism including a stationary female point-forming element and a male point-forming element cooperating with said female point-forming element and movable relative thereto to advance the formed facing to said assembly location, and a combined conveying and pressing mechanism for pressing said backing and facing against each other and for pulling the assembly through the assembly location for completing a belt.

10. A machine for forming backing from a covering and filler and for assembling said backing to a facing to form a belt comprising a support having an assembly location, means for applying adhesive first to one face of a filler as the latter is advanced along a first feed path toward said assembly location and then to the other face of said filler, means for supplying a continuous length of covering which is wider than said filler into face to face contact with said one face of said filler, means along said first feed path for turning margins of said covering into face to face contact with said other face of said filler to completely form said backing leaving a medial band of exposed ahesive on said other face of said filler, a point-forming and side-folding mechanism arranged along a second feed path directed toward said assembly location along which successive lengths of facing are advanced, and a combined conveying and pressing mechanism for pressing said backing and facing against each other and for pulling the assembly through the assembly location for completing a belt.

11. A machine for forming backing from a covering and filler comprising a support, guiding means arranged along a feed path and along which a continuous length of said filler is advanced, a first adhesive-applying head mounted on said support along said feed path for applying adhesive to one face of said filler, a second adhesive-applying head mounted on said support along said feed path for applying adhesive to the other face of said filler, said second adhesive-applying head being disposed along said feed path after said first adhesive-applying head in the direction of feed, means for supplying a continuous length of covering which is wider than said filler into face to face contact with said one face of said filler in advance of said second adhesive-applying head to partially form said backing, and means along said feed path following said second adhesive-applying head for turning margins of said covering into face to face contact with said other face of said filler to completely form said backing.

References Cited by the Examiner
UNITED STATES PATENTS

| | | | |
|---|---|---|---|
| 2,635,670 | 4/1953 | Winberg | 156—227 |
| 3,033,735 | 5/1962 | Winberg | 156—352 |
| 3,037,900 | 6/1962 | Hings et al. | 156—547 |

EARL M. BERGERT, *Primary Examiner.*

H. F. EPSTEIN, *Assistant Examiner.*